United States Patent [19] [11] Patent Number: 4,898,402
Igarashi et al. [45] Date of Patent: Feb. 6, 1990

[54] STRUCTURE FOR FIXING ANCHOR BASE ON STATIONARY BASE OF VEHICLE

[75] Inventors: Chiharu Igarashi, Hiratsuka; Yoshiniro Yokote, Yokohama; Kazuo Yamamoto, Sagamihara, all of Japan

[73] Assignee: Nippon Seiko Kabushiki Kaisha, Tokyo, Japan

[21] Appl. No.: 161,136

[22] Filed: Feb. 26, 1988

[30] Foreign Application Priority Data

Feb. 27, 1987 [JP] Japan .................. 62-27326

[51] Int. Cl.4 .............................. B60R 21/10
[52] U.S. Cl. .................. 280/804; 297/469; 297/473
[58] Field of Search ........... 280/801, 802, 804, 808; 297/469, 473, 483

[56] References Cited

U.S. PATENT DOCUMENTS 4,302,031 11/1981 Nishimura et al. ............ 280/804
4,456,283 6/1984 Michael et al. ................ 280/804
4,560,187 12/1985 Yoshitsugu .................... 280/804
4,607,863 8/1986 Yokote ......................... 280/804

FOREIGN PATENT DOCUMENTS 2024606 1/1980 United Kingdom .
3345431 8/1984 Fed. Rep. of Germany .

Primary Examiner—Kenneth R. Rice
Attorney, Agent, or Firm—Wegner & Bretschneider

[57] ABSTRACT

Disclosed herein is a structure for fixing an anchor base on a stationary base of a vehicle. The structure is suited for use in an automatic seat belt system of the type that a movable anchor travels along a guide member. The anchor base surrounds transversely the guide member on the side of an occupant-restraining position and extends in the direction of the length of the guide member. The anchor base is provided with a support portion to support the movable anchor on the anchor base. An engaging portion is formed at one side of the anchor base, said side facing the stationary base, and is hooked with an engaged portion provided on the side of the stationary base, whereby the anchor base is fixed on the stationary base.

20 Claims, 6 Drawing Sheets

STRUCTURE FOR FIXING ANCHOR BASE ON STATIONARY BASE OF VEHICLE

BACKGROUND OF THE INVENTION (1) Field of the Invention:

This invention relates to a structure for fixing a load-transmitting anchor base on a stationary base of a vehicle in an automatic seat belt system of the type that a movable anchor travels along a guide member, and especially to a structure for fixing such an anchor base on a stationary base by mutual engagement of an engaging portion of the anchor base and an engaged portion of a strength member of the stationary base.

(2) Description of the Related Art:

A conventional anchor base surrounds transversely a guide member and includes portions extending toward the front and rear of a vehicle respectively. The anchor base is fixedly secured at the frontward and rearward extensions on a center pillar (B pillar) or the like of a stationary base of the vehicle by a fastening means such as bolt. This however requires to broaden the center pillar or the like. There is a recent trend toward narrower center pillars. Conventional anchor bases are accompanied by a problem that they do not fit such narrower center pillars.

SUMMARY OF THE INVENTION

With the foregoing in view, the present invention has as a principal object the provision of a structure for fixing an anchor base on a stationary base with ease even when the anchor base is applied to such a narrow portion of the stationary base.

In one aspect of this invention, there is thus provided a structure for fixing an anchor base on a stationary base of a vehicle, which structure is suited for use in an automatic seat belt system of the type that a movable anchor travels along a guide member. The anchor base surrounds transversely the guide member on the side of an occupant-restraining position and extends in the direction of the length of the guide member The anchor base is provided with a support portion to support the movable anchor on the anchor base. An engaging portion is formed at one side of the anchor base, said side facing the stationary base, and is hooked with an engaged portion provided on the side of the stationary base, whereby the anchor base is fixed on the stationary base.

Since the engaging portion is formed in the anchor base and is hooked with the engaged portion as a strength member, the anchor base can be fixed easily and surely on the stationary base even at a part of the stationary base which part has a width either equal to or smaller than the width of the rail-surrounding portion of the the anchor base, for example, even on a narrow pillar.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
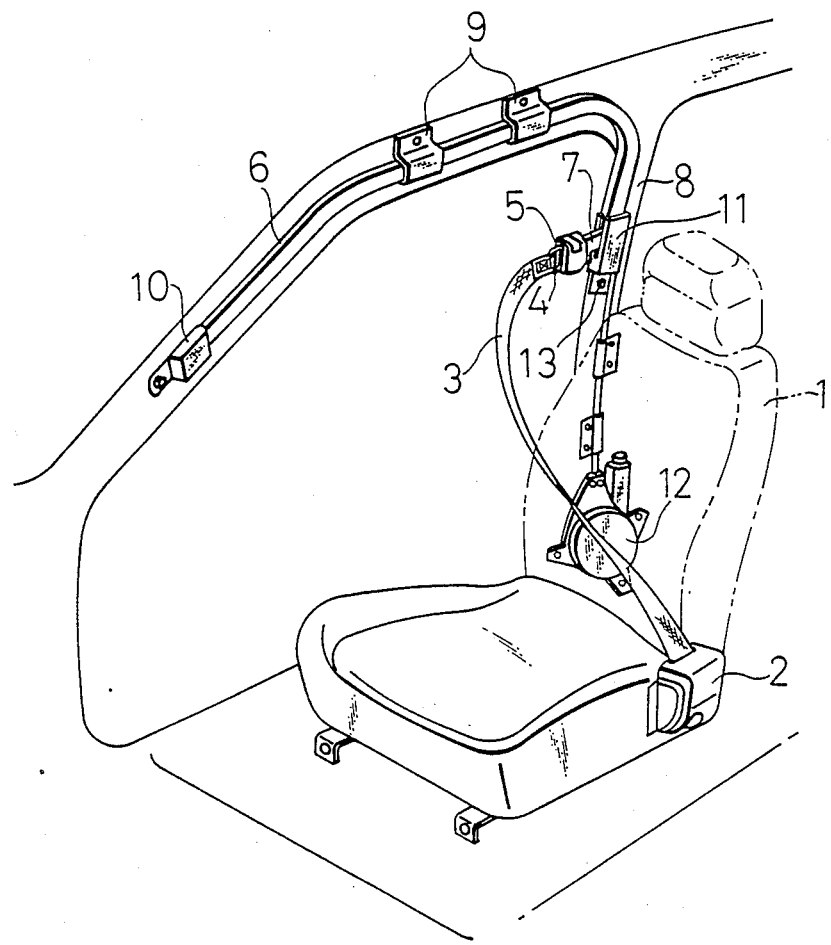
FIG. 1 illustrates the overall construction of an automatic seat belt system in which a first embodiment has been incorporated.

Referring first to FIG. 1, a retractor 2 is fixed inboard a seat 1 and a webbing 3 extends out from the retractor 2. A tongue 4 is provided on the outboard end of the webbing 3. The tongue 4 is normally locked in an emergency release buckle 5. The buckle 5 is integral with a movable anchor 7 which travels along a guide rail 6. The guide rail 6 extends rearwardly from a front part of a stationary base of a vehicle, is bent downwardly into a center pillar (B pillar) 8, and terminates there. The guide rail 6 is fixed on the stationary base by brackets 9. A front end portion of the guide rail 6 encloses a front end switch and is designated at numeral 10, while a rear end portion of the guide rail 6 is transversely surrounded by an anchor base 11 which encloses a rear end switch.

The movable anchor 7 is driven by a motor 12. The motor 12 stops as soon as the movable anchor 7 acts on the front or rear end switch.

Figure 2:
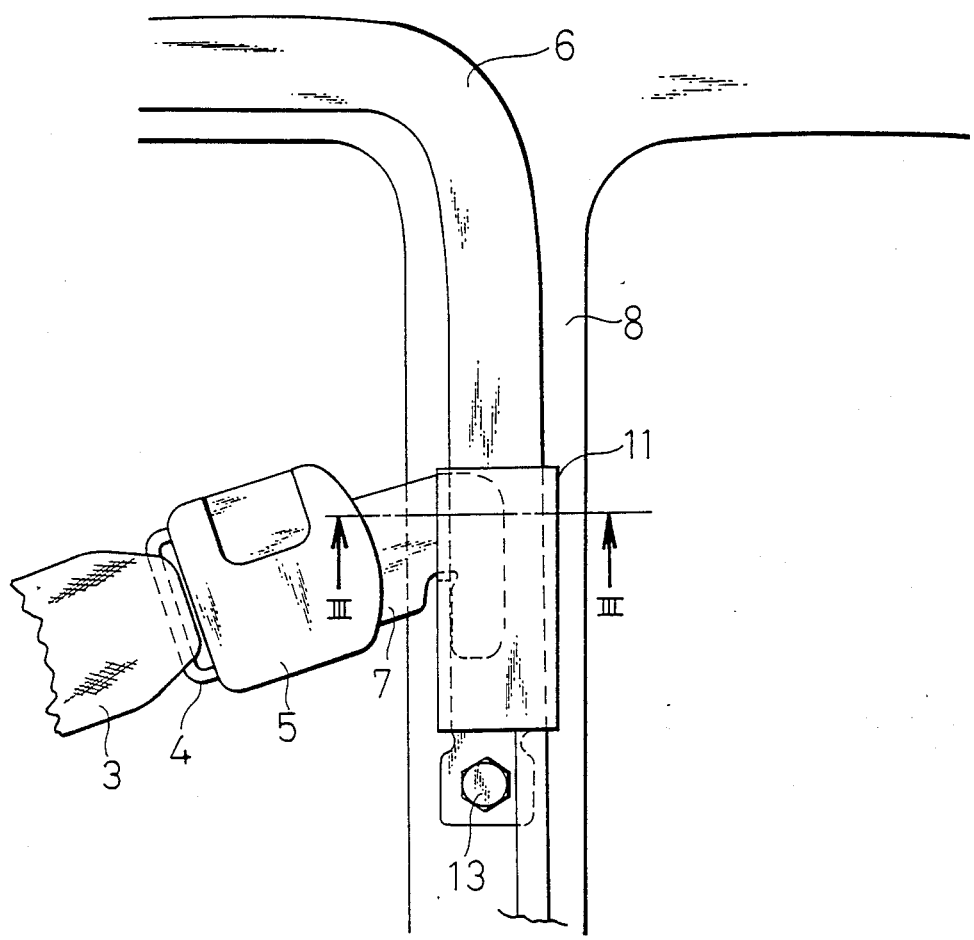
FIG. 2 is an enlarged view of an anchor base.
Figure 3:
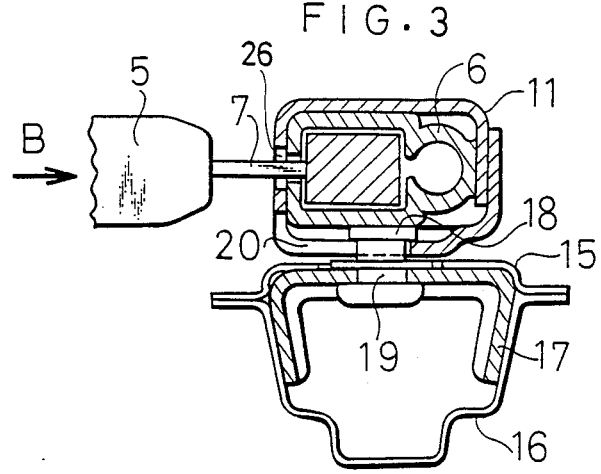
FIG. 3 is a cross-sectional view taken along line III—III of FIG. 2.
Figure 4:
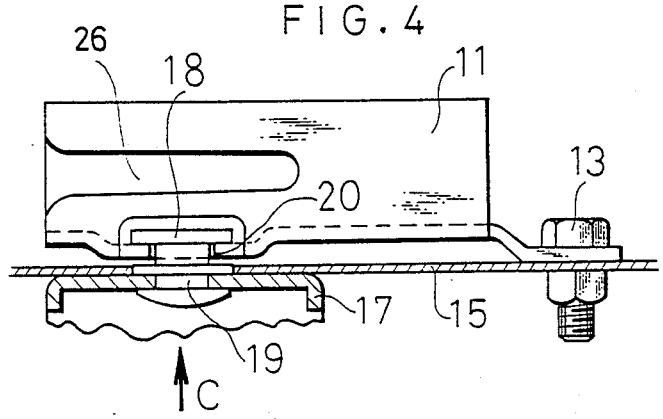
FIG. 4 is a view seen in a direction indicated by arrow B in FIG. 3.
Figure 5:
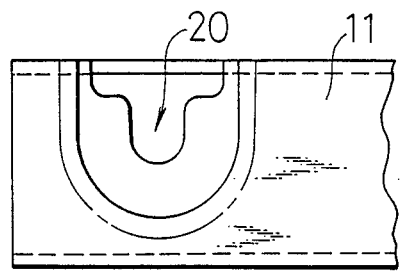
FIG. 5 is a view seen in a direction indicated by arrow C in FIG. 4.

The first embodiment of this invention is now described in detail with reference to FIGS. 2 and 3. As shown in FIG. 3, the anchor base 11 defines a slot 26 which is cut in an upper front edge and extends about one half the way down from the upper front edge. The movable anchor 7 extends outwardly through the slot 26. A pillar strength member 17 is provided by welding or the like within a spacing defined by an inner panel 15 of the center pillar 8 and an outer panel 16. On the strength member 17, a pin 19 having a head 18 as an engaged portion is provided by staking or the like. A notch 20 is formed as an engaging portion in the outer side wall of a part of the anchor base 11, which part surrounds a rear end portion of the guide rail 6. The outer side wall is therefore facing or opposing the strength member 17. The notch 20 is illustrated clearly in FIGS. 4 and 5. As apparent from these drawings, the notch 20 is closed on the rear side of the vehicle.

The head 18 of the pin 19 is in engagement with the edge of the notch 20 so that the anchor base 11 is hooked on the strength member 17. The anchor base 11 is also fastened by a bolt 13 at a part lower than the notch 20, whereby the anchor base 11 is fixed on the center pillar 8. A load, which is transmitted from the movable anchor 7 to the anchor base member 11 in the event of an emergency of the vehicle, is transmitted to the stationary base of the vehicle owing to the engagement of the closed end of the notch 20 and the pin 19.

Figure 6:
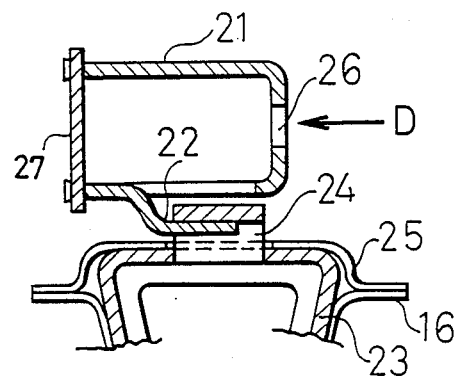
FIG. 6 is similar to FIG. 3 but shows a second embodiment of this invention.
Figure 7:
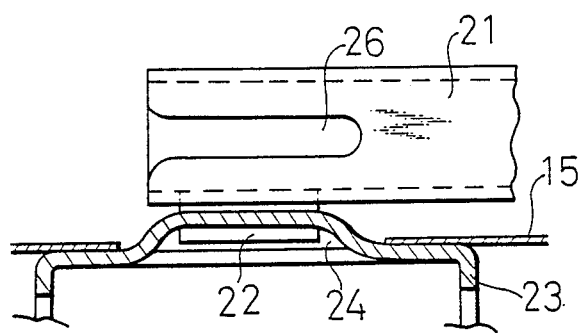
FIG. 7 is a view seen in a direction indicated by arrow D in FIG. 6.

The second embodiment of this invention will next be described with reference to FIGS. 6 and 7. Different from the first embodiment, the second embodiment is applied to an automatic seat belt system of a left-hand seat.

A hook 22 has been formed on an anchor base 21 by lancing the outer side wall of the anchor base 21. The hook 22 is connected at the rear end thereof to the anchor base 21, but the front end of the hook 22 is free. An opening 24 has been formed in a strength member 23 by slitting the strength member 23 and then raising the thus-slit part of the strength member 23 inboard. The hook 22 is inserted in the opening 24, whereby the anchor base 21 is fixed on the strength member 23. Incidentally, numerals 27,26 indicate a bridge and a slot respectively. The bridge 27 connects both free edges of the anchor base 21 to reinforce the anchor base 21. The slot 26 allows the movable anchor 7 to extend outwardly.

Figure 8:
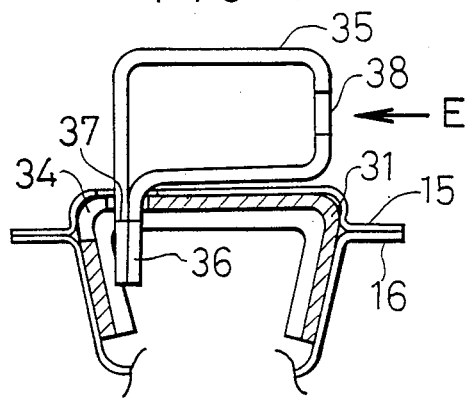
FIG. 8 is similar to FIG. 3 but depicts a third embodiment of this invention.
Figure 9:
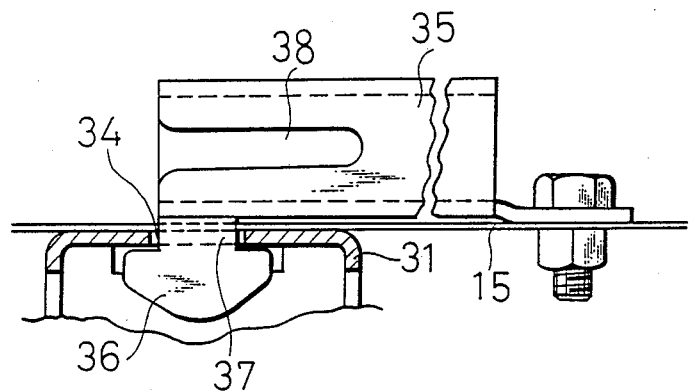
FIG. 9 is a view seen in a direction indicated by arrow E in FIG. 8.
Figure 10:
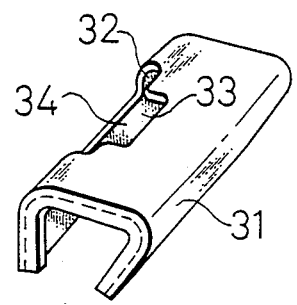
FIG. 10 is a perspective view of a strength member of the third embodiment.

Reference is now had to FIGS. 8-10, which illustrate the third embodiment. Like the second embodiment, the third embodiment is applied to an automatic seat belt system of a left-hand seat.

As depicted in FIG. 10, a strength member 31 defines an engagement hole 34 having a broader hole portion 32 and a narrower hole portion 33. An extension having a head 36 is formed on an anchor base 35. The anchor base 35 is fixed on the strength member 31 by first inserting the extension 37 into the broader hole portion 32 and then pushing the extension 37 into the narrower hole portion 33. Incidentally, numeral 38 indicates a slot which allows the movable anchor 7 to extend outwardly. The structure of the third embodiment materializes a compact fixing structure without any increase in dimensions or cost.

Figure 11:
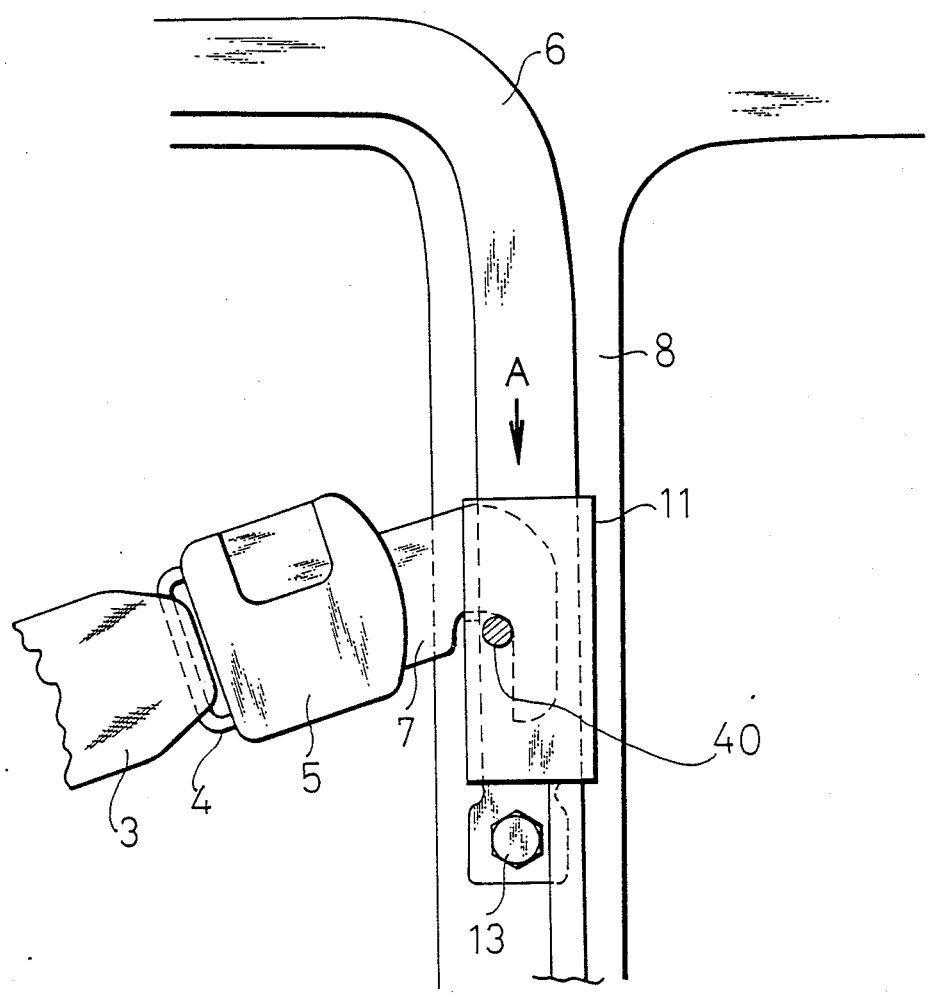
FIG. 11 illustrates one modification of the anchor base of the anchor base of FIG. 2.
Figure 12:
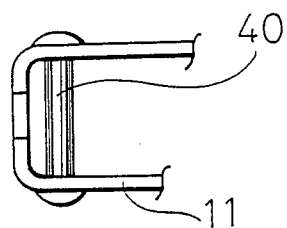
FIG. 12 is a view seen in a direction indicated by arrow A of FIG. 11.

In each of the above embodiments, the slot is cut in one edge of the anchor base as a support portion for the movable anchor 7. The form of the support portion is not limited to such a slot. For example, the upper edge of the anchor base may be left flat to support the movable anchor by the flat upper edge. Further, as shown in FIGS. 11 and 12, an anchor pin 40 may be provided fixedly between both side walls of the anchor base 11 so as to support the movable anchor pin 7 thereon.

We claim:

1. In a structure for fixing an anchor base on a stationary base of a vehicle, said structure being suited for use in an automatic seat belt system of the type that a movable anchor travels along a guide member, the improvement wherein the anchor base has been formed from a plate-like member, has a closed transverse cross-section to surround transversely an occupant-restraining end of the guide member and extends in the direction of the length of the guide member; the anchor base is provided with a support portion to support the movable anchor on the anchor base; a side of said anchor base opposite said support portion being formed by overlapping both longitudinal edge portions of said plate-like member; an engaging portion is formed at one side of the anchor base, said one side facing the stationary base when the anchor base is fixed on the stationary base, and may hook on an engaged portion provided on a side of the stationary base to fix the anchor base on the stationary base; and the engaged portion is a projection having an expanded head portion and secured fixedly on the stationary base and the engaging portion of the anchor base is a notch for receiving the projection.

2. The structure as claimed in claim 1, wherein the anchor base is provided, within the region of an imaginary longitudinal extension of the guide member, with a means for positioning one end of the anchor base relative to the stationary member.

3. The structure as claimed in claim 1, wherein the support portion is a slot cut in one edge of the anchor base.

4. The structure as claimed in claim 1, wherein the projection is a pin-like member.

5. The structure as claimed in claim 1, wherein the notch extends along the longitudinal axis of the vehicle when the anchor base is fixed on the stationary base.

6. The structure as claimed in claim 5, wherein the slot is closed on the rear side of the vehicle.

7. The structure as claimed in claim 1, wherein the support portion is an anchor pin secured fixedly on the anchor base.

8. In a structure for fixing an anchor base on a stationary base of a vehicle, said structure being suited for use in an automatic seat belt system of the type that a movable anchor travels along a guide member, the improvement wherein the anchor base has been formed from a plate-like member by overlapping both end portions of the plate-like member one over the other to have a closed transverse cross-section while transversely surrounding an occupant-restraining end of the guide member, said anchor base extending in the direction of the length of the guide member; the anchor base is provided with a support portion to support the movable anchor on the anchor base; an engaging portion is formed at one side of the anchor base, said one side facing the stationary base when the anchor base is fixed on the stationary base, and may hook in an engaged portion provided on a side of the stationary base to fix the anchor base on the stationary base; and the engaging portion is a hook having an expanded head portion formed at the overlapped end portions of the plate-like member in such a way that the expanded head portion projects toward the stationary base.

9. The structure as claimed in claim 8, wherein the anchor base is provided, within the region of an imaginary longitudinal extension of the guide member, with a means for positioning one end of the anchor base relative to the stationary member.

10. The structure as claimed in claim 8, wherein the engaged portion is an engagement hole formed in the stationary base and having a broader hole portion and a narrower hole portion, and the expanded head portion of the hook of the anchor base has dimensions such that the expanded head portion can pass through the broader hole portion but is unable to pass through the narrower hole portion.

11. The structure as claimed in claim 10, wherein the projection is an extension shaped in the form of an arrowhead.

12. The structure as claimed in claim 8, wherein the support portion is a slot cut in one edge of the anchor base.

13. The structure as claimed in claim 8, wherein the support portion is an anchor pin secured fixedly on the anchor base.

14. In a structure for fixing an anchor base on a stationary base of a vehicle, said structure being suited for use in an automatic seat belt system of the type that a movable anchor travels along a guide member, the improvement wherein the anchor base has been formed from a plate-like member, has a closed transverse cross-section to surround transversely an occupant-restraining end of the guide member and extends in the direction of the length of the guide member; the anchor base is provided with a support portion to support the movable anchor on the anchor base; a side of said anchor base opposite said support portion being formed by a second plate-like member; and engaging portion is formed at one side of the anchor base, said one side facing the stationary base when the anchor base is fixed on the stationary base, and may hook in an engaged portion provided on a side of the stationary base to fix the anchor base on the stationary base; and the engaging portion is a hook formed by lancing a portion of the anchor base toward the stationary base.

15. The structure as claimed in claim 14, wherein the anchor base is provided, within the region of an imaginary longitudinal extension of the guide member, with a means for positioning one end of the anchor base relative to the stationary member.

16. The structure as claimed in claim 14, wherein the engaged portion is an opening formed in the stationary base.

17. The structure as claimed in claim 16, wherein the opening has been formed by slitting a part of the stationary base and then raising the part toward the anchor base.

18. The structure as claimed in claim 14, wherein the hook has been formed by lancing the anchor beam in such a way that the hook extends toward the front of the vehicle when the anchor base is fixed on the stationary base.

19. The structure as claimed in claim 14, wherein the support portion is a slot formed in the anchor base.

20. The structure as claimed in claim 14, wherein the support portion is an anchor pin secured fixedly on the anchor base.

* * * * *